United States Patent
Kahyaoglu et al.

(10) Patent No.: US 11,491,734 B2
(45) Date of Patent: Nov. 8, 2022

(54) BAG-SEALING APPARATUS AND METHOD

(71) Applicant: Vestel Elektronik Sanayi ve Ticaret A.S., Manisa (TR)

(72) Inventors: Mert Kahyaoglu, Manisa (TR); Erkan Tunay, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 0 days.

(21) Appl. No.: 17/434,998

(22) PCT Filed: Mar. 7, 2019

(86) PCT No.: PCT/EP2019/055708
§ 371 (c)(1),
(2) Date: Aug. 30, 2021

(87) PCT Pub. No.: WO2020/177866
PCT Pub. Date: Sep. 10, 2020

(65) Prior Publication Data
US 2022/0134677 A1  May 5, 2022

(51) Int. Cl.
*B29C 65/22* (2006.01)
*B65B 59/00* (2006.01)
(Continued)

(52) U.S. Cl.
CPC ........ *B29C 65/224* (2013.01); *B29C 65/1412* (2013.01); *B29C 65/1467* (2013.01);
(Continued)

(58) Field of Classification Search
CPC .............. B29C 65/224; B29C 65/1412; B29C 65/1467; B29C 65/30; B29C 66/1122; B29C 66/3472; B29C 66/43121; B29C 66/71; B29C 66/73921; B29C 66/8221; B29C 66/8322; B29C 66/8324; B29C 66/84121; B29C 66/849; B29C 66/872; B29C 66/8746; B29C 66/90; B29C 66/91;
(Continued)

(56) References Cited

U.S. PATENT DOCUMENTS 2,698,273 A * 12/1954 Miner .................. B29C 66/0342
156/308.2
3,206,025 A * 9/1965 Ochs ....................... B65B 57/04
209/529

(Continued)

FOREIGN PATENT DOCUMENTS

| EP | 0468733 A1 | 1/1992 |
|---|---|---|
| WO | 2005085069 A1 | 9/2005 |
| WO | 2016168228 A1 | 10/2016 |

*Primary Examiner* — Robert F Long
*Assistant Examiner* — Eduardo R Ferrero
(74) *Attorney, Agent, or Firm* — J. Miguel Hernandez; James R. Gourley; Carstens, Allen & Gourley, LLP

(57) ABSTRACT

Bag-sealing apparatus is provided for heat-sealing a bag. The apparatus has a heater arrangement operable to apply heat to heat-seal an open end of the bag. A bag detector detects the location of the bag relative to the heater arrangement. The heater arrangement is formed of plural heater portions. The heater arrangement is operable such that only the or each heater portion that overlies the bag as detected by the bag detector is caused to operate to apply heat to the bag.

19 Claims, 2 Drawing Sheets

(51) Int. Cl.
    *B29C 65/14*       (2006.01)
    *B29C 65/30*       (2006.01)
    *B29C 65/00*       (2006.01)
    *B65B 31/04*       (2006.01)
    *B65B 51/14*       (2006.01)
    *B65B 53/04*       (2006.01)
    *B65B 57/08*       (2006.01)
    *B29L 31/00*       (2006.01)

(52) U.S. Cl.
    CPC .......... *B29C 65/30* (2013.01); *B29C 66/1122* (2013.01); *B29C 66/3472* (2013.01); *B29C 66/43121* (2013.01); *B29C 66/71* (2013.01); *B29C 66/73921* (2013.01); *B29C 66/8221* (2013.01); *B29C 66/8322* (2013.01); *B29C 66/8324* (2013.01); *B29C 66/849* (2013.01); *B29C 66/84121* (2013.01); *B29C 66/872* (2013.01); *B29C 66/8746* (2013.01); *B65B 31/048* (2013.01); *B65B 51/146* (2013.01); *B65B 53/04* (2013.01); *B65B 57/08* (2013.01); *B65B 59/003* (2019.05); *B29L 2031/7128* (2013.01)

(58) Field of Classification Search
    CPC ............ B29C 66/914; B29C 66/91421; B29C 66/91423; B29C 66/81469; B29L 2031/7128; B65B 31/048; B65B 51/146; B65B 53/04; B65B 59/003; B65B 57/08; B65B 57/04; B65B 57/12; B65B 57/14
    See application file for complete search history.

(56) References Cited

U.S. PATENT DOCUMENTS

| | | | | |
|---|---|---|---|---|
| 3,228,170 A * | 1/1966 | Eisenstadt | ............. | B29C 66/133 53/554 |
| 3,449,887 A * | 6/1969 | Abramson | ............. | B65B 57/04 53/76 |
| 3,472,374 A * | 10/1969 | Ness | ............. | B65B 57/12 209/591 |
| 3,624,836 A * | 11/1971 | Rohdin | ............. | B29C 66/91216 100/319 |
| 3,628,302 A * | 12/1971 | Roberts | ............. | B65B 57/14 53/502 |
| 3,652,357 A * | 3/1972 | Vogel | ............. | B65B 57/04 156/203 |
| 3,715,857 A * | 2/1973 | Fronczak | ............. | B65B 25/16 53/385.1 |
| 3,782,069 A | 1/1974 | Fischbein et al. | | |
| 3,807,122 A * | 4/1974 | Kihnke | ............. | B65B 57/08 53/506 |
| 3,930,352 A * | 1/1976 | Carnes | ............. | B65B 57/04 53/384.1 |
| 3,975,885 A * | 8/1976 | Carlisle | ............. | B29C 66/005 53/558 |
| 4,221,101 A * | 9/1980 | Woods | ............. | B29C 66/8167 53/512 |
| 4,533,423 A * | 8/1985 | Johnson | ............. | B29C 66/932 156/499 |
| 4,609,107 A * | 9/1986 | Martin | ............. | B29C 66/81457 383/77 |
| 4,649,259 A * | 3/1987 | Zurn | ............. | B29C 66/91213 156/583.9 |
| 4,889,522 A * | 12/1989 | Gietman, Jr. | ............. | B29C 64/4332 493/193 |
| 4,996,819 A * | 3/1991 | Davis | ............. | B65B 9/023 53/64 |
| 5,019,027 A * | 5/1991 | Boeckmann | ............. | B29C 66/346 493/193 |
| 5,048,266 A * | 9/1991 | Wieckowicz | ............. | B65B 43/26 53/506 |
| 5,374,179 A * | 12/1994 | Swanson | ............. | B29C 66/81427 264/327 |
| 5,644,895 A * | 7/1997 | Edwards | ............. | B29C 66/24221 53/64 |
| 5,993,593 A * | 11/1999 | Swartz | ............. | B29C 66/81611 156/308.4 |
| 6,255,620 B1 * | 7/2001 | Gershenson | ............. | B29C 65/086 219/121.72 |
| 6,323,468 B1 * | 11/2001 | Dabelstein | ............. | B29C 66/474 219/617 |
| 8,884,201 B2 * | 11/2014 | Matsen | ............. | H05B 6/40 219/602 |
| 8,963,058 B2 * | 2/2015 | Matsen | ............. | B29C 33/06 219/618 |
| 11,254,457 B2 * | 2/2022 | McDonald | ............. | B65B 35/24 |
| 2004/0031552 A1 * | 2/2004 | Basque | ............. | B29C 66/91231 156/359 |
| 2005/0193689 A1 * | 9/2005 | Basque | ............. | B29C 66/9241 53/551 |
| 2007/0167304 A1 * | 7/2007 | Selle | ............. | B29C 65/7433 493/175 |
| 2011/0059833 A1 * | 3/2011 | Kiyota | ............. | B29C 66/81821 493/189 |
| 2012/0241074 A1 * | 9/2012 | Parkinson | ............. | B29C 65/224 156/60 |
| 2013/0281278 A1 * | 10/2013 | Selle | ............. | B29C 65/38 493/370 |
| 2014/0352253 A1 * | 12/2014 | Yamamoto | ............. | B29C 66/8224 53/76 |
| 2016/0001909 A1 * | 1/2016 | Schütte | ............. | B65B 51/146 53/134.1 |
| 2017/0205530 A1 * | 7/2017 | Fujitomi | ............. | B65B 57/04 |
| 2018/0370669 A1 | 12/2018 | Xu et al. | | |
| 2019/0055042 A1 | 2/2019 | Leppert et al. | | |

* cited by examiner

BAG-SEALING APPARATUS AND METHOD

CROSS REFERENCE TO RELATED APPLICATION

This application is a US 371 application from PCT/EP2019/055708 entitled "BAG-SEALING APPARATUS AND METHOD" filed on Mar. 7, 2019 and published as WO 2020/177866 A1 on Sep. 10, 2020. The technical disclosures of every application and publication listed in this paragraph are hereby incorporated herein by reference.

TECHNICAL FIELD

The present disclosure relates to a bag-sealing apparatus and a method of heat-sealing a bag.

BACKGROUND

A bag-sealing apparatus is used to heat-seal the open end of a hag, typically in order to keep the contents of the bag free from dirt and other contamination, so as to assist in preserving the contents and to improve the shelf life of the contents, especially in the case that the contents are food or drink, etc. The bag-sealing apparatus may be a vacuum bag-sealing apparatus which sucks air out of the bag prior to the bag being heat-sealed, which further aids in keeping the contents of the bag clean and even sterile. The bag-sealing apparatus has a heater, which is typically an electrically resistive heater in the form of a strip, over which the open end of the hag is placed when the hag is to be heat-sealed.

SUMMARY

According to a first aspect disclosed herein, there is provided bag-sealing apparatus for heat-sealing a bag, the apparatus comprising:

a heater arrangement operable to apply heat to heat-seal an open end of a hag which is inserted in use into the bag-sealing apparatus; and a bag detector constructed and arranged to detect the location of a said bag relative to the heater arrangement when a said bag is inserted in use into the bag-sealing apparatus;

wherein the heater arrangement is formed of plural heater portions;

the heater arrangement being operable such that only the or each heater portion that overlies a said bag inserted in use into the bag-sealing apparatus as detected by the bag detector is caused to operate to apply heat to a said bag.

So, for example, for large bags that fully cover the heater arrangement, all of the heater portions are operated to seal the open end of the bag along its full extent. On the other hand, for a smaller bag that does not fully cover the heater arrangement, only the heater portions that are required to seal the open end of the smaller bag are operated: any heater portion that does not (fully or partially) overlie the smaller bag is not operated. This can lead to energy savings as only those heater portions that actually overlie the bag and that are actually needed to heat-seal the bag are operated so as to heat-seal the bag. The heater portions may be operable independently of each other.

In an example, the plural heater portions of the heater arrangement are electrically resistive heaters.

Other heater arrangements having plural heater portions are possible, including for example infrared heaters, which may be independently operable.

In an example, the bag-sealing apparatus comprises:

a first member and a second member arranged to receive a bag therebetween;

the heater arrangement being arranged on at least one of the first and second members so as to be operable to apply heat to heat-seal an open end of a said bag when a said bag is received between the first and second members;

wherein the bag detector is provided by at least one of the first and second members comprising a plurality of air holes, through which air can be blown or sucked, and at least one air pressure sensor in communication with the air holes and arranged to sense changes in air pressure which occur if a said bag obstructs one or more of the air holes when a said bag is received between the members for heat-sealing, thereby to enable the location of a said bag relative to the heater arrangement to be detected.

The first and second members may be plates or blocks or bars or the like and, in use, are typically brought together to trap the bag when the bag is to be heat-sealed.

The air holes may go all the way through the member, so that air can be pushed/pulled from the other side. Alternatively or additionally, one or more or all of the air holes may just be outlets/inlets to receive/supply air through channels in through the member which open to the air holes.

In an example, the bag-sealing apparatus comprises an air pump in communication with the air holes for blowing or sucking air through the air holes.

Alternatively or additionally to use of air holes and one or more air pressure sensors, etc., the bag detector may be optical, with one or more light sources emitting light that is detected by one or more light detectors and which can detect the location of the bag by virtue of the bag obstructing the light. However, such bags are often transparent so optical detectors may not always be effective or convenient.

In an example, the hag-sealing apparatus is a vacuum bag-sealing apparatus constructed and arranged to suck air out of a bag which is inserted in use the bag-sealing apparatus and prior to the heater arrangement applying heat to heat-seal an open end of a said bag.

In an example, the bag-sealing apparatus comprises a controller in communication with the heater arrangement and the bag detector, the controller being constructed and arranged to receive an input from the bag detector relating to the location of a said bag relative to the heater arrangement and to control the heater arrangement to operate in accordance with the input from the bag detector.

According to a second aspect disclosed herein, there is provided a method of heat-sealing a bag using a bag-sealing apparatus having a heater arrangement which is formed of plural independently operable heater portions, the method comprising: placing an open end of the bag in the bag-sealing apparatus;

detecting the location of the bag relative to the heater arrangement; and operating the heater arrangement to heat-seal the bag;

wherein the heater arrangement is operated such that only the or each heater portion that overlies the bag placed in the bag-sealing apparatus as detected by the bag detector is caused to operate to apply heat to the bag.

In an example, the bag-sealing apparatus comprises a first member and a second member arranged to receive the bag therebetween, the heater arrangement being arranged on at least one of the first and second members so as to be operable to apply heat to heat-seal an open end of the bag when the bag is placed between the first and second members, at least one of the first and second members comprising a plurality of air holes;

wherein placing an open end of the bag in the bag-sealing apparatus comprises placing the bag between the first and second members;

the method comprising:

blowing or sucking air through the air holes; and detecting the location of the bag relative to the heater arrangement by sensing ID changes in air pressure which occur if the bag obstructs one or more of the air holes when the bag is received between the members for heat-sealing.

In an example, the bag-sealing apparatus is a vacuum bag-sealing apparatus, the method comprising sucking air out of the bag prior to operating the heater arrangement to heat-seal the bag.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
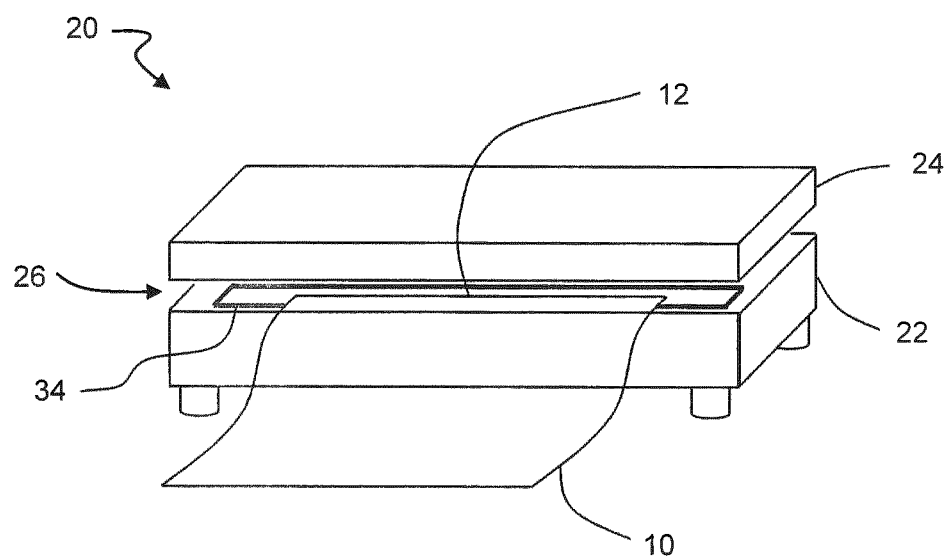
FIG. 1 shows schematically a perspective view of an example of a bag-sealing apparatus according to an embodiment of the present disclosure.

Referring to FIG. 1, there is shown an example of a bag-sealing apparatus 20 according to an embodiment of the present disclosure which is used to seal a bag 10. The bag-sealing apparatus 20 may be used to heat-seal the open end 12 of the bag 10 in order to keep the contents of the bag 10 free from dirt and other contamination, so as to assist in preserving the contents and to improve the shelf life of the contents, especially in the case that the contents are food or drink, etc.

The bag-sealing apparatus 20 has a lower base 22 and an upper hood or cover 24. The base 22 and the hood 24 provide a space 26 therebetween into which the open end 12 of the bag 10 can be inserted for heat-sealing. In some examples, the base 22 and hood 24 are fixed relative to each other. In other examples, the base 22 and hood 24 are hingedly fixed or otherwise movable relative to each other so that the hood 24 can be raised to allow a bag 10 to be more easily inserted into and removed from the space 26 between the base 22 and hood 24.

The bag 10 may be provided as an individual item, which may for example be closed or pre-sealed on two edges and the bottom and open along the top. More commonly, such bags 10 are formed from a roll of bag stock which has two opposing side edges which are pre-sealed. A desired length of bag 10 is cut off the roll. In some cases, the initially cut bag 10 has two opposed pre-sealed side edges and two opposed open ends, and one end is sealed to provide a bag 10 which has one open end and which is then ready to receive contents. In other cases, the initially cut bag 10 has two opposed pre-sealed side edges and one pre-sealed (bottom) edge and an open (top) end and is ready to receive contents. The bag 10 may be cut by a cutter that is provided as part of the bag-sealing apparatus 20 as is known per se, or may be cut by a separate knife or cutting arrangement. Such bags 10 are commonly formed of a plastics material or composites of different plastics material, such as for example polyethylene (PE), polyamide (PA), etc. Such bags 10 are often transparent, or at least translucent, so as to allow the contents to be viewed. The bag 10 may be a heat-shrinkable bag. In such a case, after the open 12 end of the bag 10 is sealed, the bag 10 is moved to a hot water or hot air shrink tunnel which induces shrinkage of the bag 10 around the food item or other contents.

Figure 2:
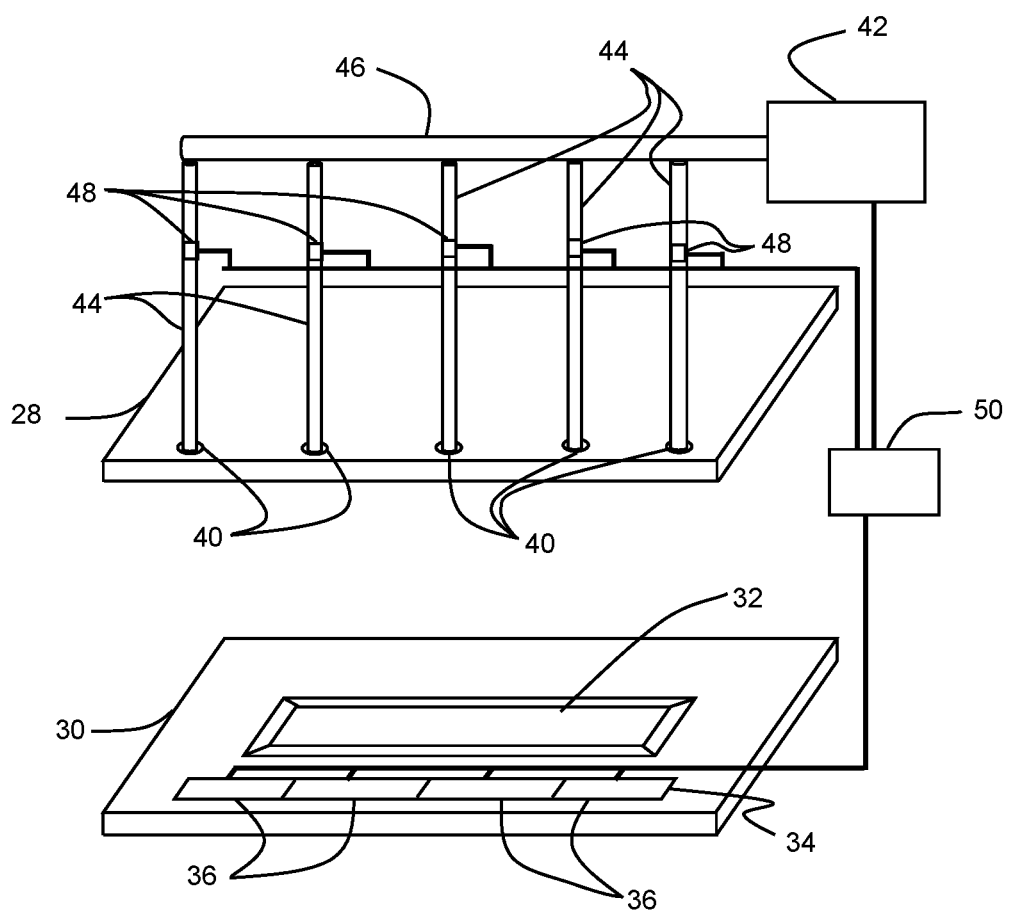
FIG. 2 shows schematically a perspective view of components of the interior of the bag-sealing apparatus of FIG. 1.

Referring particularly to FIG. 2, this shows schematically a perspective view of the main components of the interior of the bag-sealing apparatus 20. The bag-sealing apparatus 20 has an upper member 28 which is fixed in use in the hood 24. The bag-sealing apparatus 20 has a lower member 30 which is fixed in use in the base 22. The upper member 28 and the lower member 30 define the space 26 into which the bag 10 can be inserted for heat-sealing. Each of the upper member 28 and the lower member 30 may be a plate or a block or a bar or the like and may be made of plastics, metal, etc. In use, the upper member 28 and the lower member 30 may be moved apart to allow the bag 10 to be inserted and brought close to each other to effectively trap the open end 12 of the bag 10 between the upper member 28 and the lower member 30. This movement of the upper member 28 and the lower member 30 relative to each other may be achieved by for example moving the hood 24 relative to the base 22.

The bag-sealing apparatus 20 of this example is a vacuum bag-sealing apparatus 20 which draws or sucks air out of the bag 10 prior to the bag 10 being heat-sealed. This further aids in keeping the contents of the bag clean and even sterile. For this and in a manner known per se, at least one of the upper member 28 and the lower member 30 (in this example, the lower member 30) has an evacuation groove 32 which is in fluid communication with a vacuum pump (not shown). In use, the bag 10 is partly inserted into the apparatus 20 such that the open end 12 of the bag 10 is located in the evacuation groove 32. The vacuum pump is then operated to substantially or fully evacuate the bag 10 prior to the open end 12 of the bag 10 being heat-sealed as will be discussed further below. Nevertheless, the principles described herein may be applied to any bag-sealing apparatus of this general type regardless of whether or not the bag-sealing apparatus is a vacuum bag-sealing apparatus.

The bag-sealing apparatus 20 has a heater 34 which can be operated to heat-seal the open end 12 of the bag 10 when the open end 12 of the bag 10 is inserted into the apparatus 20. In this example, as is common, the heater 34 is located on an upper surface of the lower member 30. In other examples, the heater 34 may located on a lower surface of the upper member 28 or there may be heaters on the opposing surfaces of both the upper member 28 and the lower member 30. When a bag 10 is inserted into the bag-sealing apparatus 20, the open end 12 of the bag 10 is brought into contact with or close to the heater 34 to allow the heater 34 to heat the open end 12 of the bag 10 to seal the bag 10.

In a conventional bag-sealing apparatus, the heater is usually a single, unitary heater, typically in the form of a strip heater, which heats along its whole length when operated. However, in accordance with embodiments of the present disclosure, the heater 34 is formed of plural heater portions. In examples, at least some and optionally all of the plural heater portions are operable independently of each other. That is, in an example any one of the heater portions can be operated independently of the others or at least some of the heater portions can be operated independently of the others.

In this example, the heater 34 is in the form of a strip and is formed of several heater portions 36. In the example shown, there are four heater potions 36 arranged in line, but in other examples there may be more or fewer heater portions. In this example, the heater 34 and therefore each heater portion 36 is an electrically resistive heater which is connected in use to a power source, such as for example a mains electricity power supply. When the open end 12 of the bag 10 is inserted into the space 26 between the upper member 28 and the lower member 30, the electrically resistive heater 34 contacts the bag 10 and is operated to heat-seal the open end 12 of the bag 10. Other heater arrangements may be used, in addition to or instead of electrically resistive heaters. For example, one or all of the heater portions 36 may be provided by infrared heaters or some other heat source.

In accordance with the present disclosure, only the or each heater portion 36 that overlies the (open end 12 of) the bag 10 when the bag 10 is inserted into the apparatus 20 is operated to heat-seal the open end 12 of the bag 10. In practice, such bags 10 come in a variety of sizes, including in particular different widths w. This can mean that for a narrow bag 10 with a small width w, the bag 10 only overlies a part of the overall heater 34. In a conventional bag-sealing apparatus, this means that parts of the heater are being energised even though not all of the heater is applying heat to the bag. This results in a waste of energy and can mean that parts of the heater or the conventional bag-sealing apparatus as a whole become unnecessarily and potentially dangerously hot. This is avoided with a bag-sealing apparatus 20 according to the present disclosure as only those heater portions 36 of the heater 34 that are actually required to heat the bag 10 are energised. For a large bag 10, that is, a bag 10 that has a relatively large width w that fully covers the heater 34, all of the heater portions 36 are operated to seal the open end 12 of the bag 10 along its full extent. On the other hand, for a smaller bag 10, that is, a bag 10 that has a relatively narrow width w that does not fully cover the heater 34, only the heater portions 36 that are required to seal the open end 12 of the smaller bag 10 are operated. That is, only the heater portions 36 that extend across the width of the smaller bag 10 are operated to heat-seal the open end 12 of the bag 10: any heater portion 36 that does not (fully or partially) overlie the bag 10 is not operated. This reduces energy consumption and can keep down the temperature of parts of the bag-sealing apparatus 20 when smaller bags 10 are being sealed.

The bag-sealing apparatus 20 has a bag detector which operates to detect the location of a bag 10 relative to the heater 34, and particularly detects the location of a bag 10 relative to the heater portions 36, when the bag 10 is inserted into the bag-sealing apparatus 20. The bag-sealing apparatus 20 may have a wall or ridge or detent or the like (not shown) located inwardly of the heater 34. This acts as an abutment or register against which the open end of the bag 10 abuts when the bag 10 is inserted correctly into the bag-sealing apparatus 20. At this point, the bag 10 is in contact with or close to the heater 34. A number of options for the bag detector are possible and more than one type of bag detector may be used.

For example, the bag detector may be or include one or more contact or position sensors arrayed generally along or near the heater 34. The contact position sensors measure the position of the bag 10 and, in particular, provide an indication of the position of the bag 10 relative to the heater 34 and the heater portions 36 in particular. A problem with contact or position sensors in the present context is that the bags 10 that are used tend to be very pliable or flexible and so not all such bags may trigger a contact or position sensor correctly or reliably. Accordingly, contact or position sensors may not be optimal for all applications.

As another example, the bag detector may be or include one or more optical sensor arrangements arrayed generally along or near the heater 34. The optical sensor arrangements optically detect the position of the bag 10 relative to the heater 34 and the heater portions 36 in particular. The or each optical sensor arrangement includes for example a light source, such as for example a light emitting diode (LED), and a light detector, such as for example a photodiode. A problem with optical sensor arrangements in the present context is that the bags 10 that are used are often transparent or at least translucent and so optical detectors may not always detect the location of the bag 10 correctly or reliably.

In the example shown schematically in FIG. 2, the bag detector uses air to detect the location of the bag 10, as will be discussed further below. The bag detector may use only air or may use air in conjunction with some other type of bag detector, such as contact or position sensors, optical sensors, etc. The use of air to detect the location of the bag 10 avoids the problems of contact sensors and optical sensor arrangements discussed above.

Referring further to FIG. 2, in this example at least one of the upper member 28 and the lower member 30 has a plurality of air holes 40. The air holes 40 open out so as to face the opposed member 30, 28. In this example, only the upper member 28 has air holes 40 and the air holes 40 open out to oppose the lower member 30. In particular, the air holes 40 oppose, at least generally, the heater 34. In this example, the air holes 40 are arranged in a line which runs parallel to the elongate, strip-like heater 34. As will be appreciated from the following, air can be pushed or blown out through the air holes 40 over a bag 10 or air can be sucked in through the air holes 40 from adjacent a bag 10, and pressure changes measured or detected to determine the location of the bag 10. In practice, an example that uses blowing or pushing of air is likely to be more reliable and accurate and this example will be described further here, it being understood that only minor changes are required to go from detection that uses blowing or pushing of air to detection that uses sucking of air.

In more detail, in this example the air holes 40 are in fluid communication with an air pump 42. For this, in this example, the air holes 40 pass entirely through the upper member 28 from one face of the upper member 28 to the other. Pipes 44 or hoses or the like connect the rear faces of the respective air holes 40 to the air pump 42, optionally via a common manifold 46. The pipes 44 may be rigid or flexible. Some of the pipes 44 are shown in FIG. 2 with dashed lines for clarity. In other examples, some or all of the air holes 40 do not pass entirely through the upper member 28 and, instead, the upper member 28 has channels which effectively provide pipes which are in fluid communication with the air pump 42 and through which air passes to or from the air holes 40.

Each of the pipes 44 contains or includes an air pressure sensor 48 which can measure the air pressure within the pipe 44 or at least sense changes in air pressure within the pipe 44 and provide an output accordingly.

Moreover, in this example, the output of each air pressure sensor 48 is passed to a controller 50 which also operates to control the heater 34 and particularly the heater portions 36. The controller 50 may also operate to control the air pump 42. The controller 50 may be provided by a processor or processing system and may be for example a microcontroller. Whilst a controller 50 which is suitably programmed may provide for more flexible control of the heater 34 and particularly the heater portions 36, in other examples there is no such controller and its function can be implemented by logic gates or the like to operate the heater portions 36 in accordance with the outputs of the sensors 48.

In use, when a large (wide) bag 10 is inserted into the bag-sealing apparatus 20, assume that the open end 12 of the bag 10 overlies all of the heater portions 36 of the heater 34. In such a case, the bag 10 will effectively block all of the air holes 40 in this example. This means that when the air pump 42 is operated to blow air through the pipes 44 to the air holes 40, the air pressure within each pipe 44 as measured by its respective air pressure sensor 48 will rise. The fact that the air pressure within each pipe 44 rises is taken as an indication that the bag 10 is covering each air hole 40 and therefore the entire extent of the heater 34. For this, there may be some threshold for the air pressure as measured by each air pressure sensor 48, which may be the same or different for each pipe 44 and its sensor 48, such that a rise in air pressure above the threshold for a pipe 44 is taken as an indication that the bag 10 is blocking the associated air hole 40. In any event, in such a case, the heater 34 is operated so that each heater portion 36 is energised so as to heat the open end 12 of the large bag 10 along its full extent.

On the other hand, when a small (narrow) bag 10 is inserted into the bag-sealing apparatus 20, assume that the open end 12 of the bag 10 overlies only one or some but not all of the heater portions 36 of the heater 34. In such a case, the bag 10 will effectively block only one or some of the air holes 40 whereas one or more other air holes 40 will not be blocked by the bag 10. This means that when the air pump 42 is operated to blow air through the pipes 44 to the air holes 40, the air pressure within only one or some of the pipes 44 as measured by the or each respective air pressure sensor 48 will rise. Again, the fact that the air pressure within a pipe 44 rises is taken as an indication that the bag 10 is covering the corresponding air hole 40. On the other hand, for any pipe 44 that leads to an air hole 40 that is not blocked by the bag 10, the air pressure will not rise or will only rise by a lesser amount. Therefore, from the outputs of each air pressure sensor 48 for the various pipes 44, the lateral extent of the bag 10 can be determined. The heater 34 is then operated so that only those heater portions 36 that correspond to the location of the open end 12 of the bag 10 are operated so as to heat-seal the bag 10. This provides at least a power saving as heater portions 36 that are not required to seal the smaller bag 10 are not energised.

The controller or logic circuitry or the like which receives inputs from the air pressure sensors 48 and controls the heater 34 and the heater portions 36 accordingly may be arranged so that physically impossible situations are ignored. For example, a bag 10 cannot (properly) overlie only heater portions 36 that are at the opposite ends of the heater 34 and not overlie any central heater portion 36. If the bag detector arrangement indicates such a situation, an alarm or warning may be generated for the user.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. Bag-sealing apparatus for heat-sealing a bag, the apparatus comprising:
   a plurality of heater portions configured to apply heat to heat-seal an open end of said bag which is inserted in use into the bag-sealing apparatus, wherein at least some of the heater portions can be operated to apply heat to heat-seal said open end of said bag independently of the other heater portions; and
   a bag detecting means constructed and arranged to detect the location of said bag relative to the heater portions when said bag is inserted in use into the bag-sealing apparatus;
   the heater portions being constructed and arranged such that only the or each heater portion that overlies said bag inserted in use into the bag-sealing apparatus as detected by the bag detecting means is caused to operate to apply heat to said bag.

2. Bag-sealing apparatus according to claim 1, wherein the plural heater portions are electrically resistive heaters, wherein at least some of the electrically resistive heaters can be operated to apply heat to heat-seal said open end of said bag independently of the other electrically resistive heaters.

3. Bag-sealing apparatus according to claim 2, comprising a controller in communication with the heater portions and the bag detecting means, the controller being constructed and arranged to receive an input from the bag detecting means relating to the location of a said bag relative to the heater portions and to control the electrically resistive heaters to operate in accordance with the input from the bag detecting means.

4. Bag-sealing apparatus according to claim 1, comprising:
a first member and a second member arranged to receive said bag therebetween;
the heater portions being arranged on at least one of the first and second members so as to be operable to apply heat to heat-seal said open end of said bag when said bag is received between the first and second members;
wherein the bag detecting means is provided by at least one of the first and second members comprising a plurality of air holes, through which air can be blown or sucked, and at least one air pressure sensor in communication with the air holes and arranged to sense changes in air pressure which occur if said bag obstructs one or more of the air holes when said bag is received between the members for heat-sealing, thereby to enable the location of said bag relative to the heater portions to be detected.

5. Bag-sealing apparatus according to claim 4, comprising an air pump in communication with the air holes for blowing or sucking air through the air holes.

6. Bag-sealing apparatus according to claim 4, wherein the plural heater portions are electrically resistive heaters, wherein at least some of the electrically resistive heaters can be operated to apply heat to heat-seal an open end of a bag independently of the other electrically resistive heaters.

7. Bag-sealing apparatus according to claim 6, comprising a controller in communication with the heater portions and the bag detecting means, the controller being constructed and arranged to receive an input from the bag detecting means relating to the location of a said bag relative to the heater portions and to control the electrically resistive heaters to operate in accordance with the input from the bag detecting means.

8. Bag-sealing apparatus according to claim 4, comprising a controller in communication with the heater portions and the bag detecting means, the controller being constructed and arranged to receive an input from the bag detecting means relating to the location of a said bag relative to the heater portions and to control the heater portions to operate in accordance with the input from the bag detecting means.

9. Bag-sealing apparatus according to claim 1, wherein the bag-sealing apparatus is a vacuum bag-sealing apparatus constructed and arranged to suck air out of said bag which is inserted in use into the bag-sealing apparatus and prior to the heater portions applying heat to heat-seal said open end of said bag.

10. Bag-sealing apparatus according to claim 1, comprising a controller in communication with the heater portions and the bag detecting means, the controller being constructed and arranged to receive an input from the bag detecting means relating to the location of said bag relative to the heater portions and to control the heater portions to operate in accordance with the input from the bag detecting means.

11. Bag-sealing apparatus according to claim 1, wherein the bag detecting means is provided by one or more optical sensors arranged to detect the position of the bag relative to the heater portions.

12. Bag-sealing apparatus according to claim 1, wherein the bag detecting means is provided by one or more contact or position sensors arranged to measure the position of the bag relative to the heater portions.

13. A method of heat-sealing a bag using a bag-sealing apparatus having a plurality of independently operable heater portions, the method comprising:
detecting the location of the bag relative to the heater portions when an open end of the bag is placed in the bag-sealing apparatus; and
operating the heater portions
such that only the or each heater portion that overlies the bag placed in the bag-sealing apparatus as detected by a bag detecting means is caused to operate to apply heat to the bag to heat-seal the bag.

14. A method according to claim 7, wherein the bag-sealing apparatus comprises a first member and a second member arranged to receive the bag therebetween, the heater portions being arranged on at least one of the first and second members so as to be operable to apply heat to heat-seal said open end of the bag when the bag is placed between the first and second members, at least one of the first and second members comprising a plurality of air holes;
wherein the open end of the bag is placed between the first and second members;
the method comprising:
blowing or sucking air through the air holes; and
detecting the location of the bag relative to the heater portions by sensing changes in air pressure which occur if the bag obstructs one or more of the air holes when the bag is received between the members for heat-sealing.

15. A method according to claim 13, wherein the bag-sealing apparatus is a vacuum bag-sealing apparatus, the method comprising sucking air out of the bag prior to operating the heater portions to heat-seal the bag.

16. A method according to claim 13, wherein the independently operable heater portions are electrically resistive heaters.

17. A method according to claim 13, wherein the bag-sealing apparatus comprises a controller, wherein the controller receives an input from the bag detecting means relating to the location of the bag relative to the heater portions and controls the heater portions to operate in accordance with the input from the bag detecting means.

18. A method according to claim 13, wherein the bag detecting means is provided by one or more optical sensors which detect the position of the bag relative to the heater portions.

19. A method according to claim 13, wherein the bag detecting means is provided by one or more contact or position sensors which measure the position of the bag relative to the heater portions.

* * * * *